Aug. 19, 1941.　　　W. J. MORRILL　　　2,253,191

DYNAMOELECTRIC MACHINE

Filed Sept. 19, 1939

Inventor:
Wayne J. Morrill,
by Harry E. Dunham
His Attorney.

Patented Aug. 19, 1941

2,253,191

UNITED STATES PATENT OFFICE 2,253,191

DYNAMOELECTRIC MACHINE

Wayne J. Morrill, Fort Wayne, Ind., assignor to General Electric Company, a corporation of New York Application September 19, 1939, Serial No. 295,623

11 Claims. (Cl. 171—252)

My invention relates to improvements in dynamo-electric machines, and more particularly to an improved means and method for more effectively mounting the field exciting windings or coil members on the core member thereof.

Heretofore it has been customary in the manufacture of dynamo-electric machines to insulate separately the coil members by wrapping the conductors with a suitable tape such as varnished cambric, and subsequently impregnating the coils with a wax, a synthetic rubber, or any suitable liquefied insulation.

An object of my invention is to provide a simple and more economical insulation for this type of machine.

Another object of my invention is to provide relatively stiff insulating material made to conform with the same general configuration as that of the core member for supporting and insulating coils mounted thereon.

A further object of my invention is to provide on two sides of the core member a sheet of relatively stiff insulating material made to conform with the same general configuration as that of the core member for supporting and insulating coils mounted thereon.

A still further object of my invention is to provide a relatively stiff sheet of insulation upon which the terminals of the coil members may be placed and the between-pole connections conveniently supported.

A still further object of my invention is to provide a combination spacer and rivet for supporting the core member in spaced relation to the supporting end plates.

Further objects and advantages of my invention will become apparent from the following description referring to the accompanying drawing, and the features of novelty which characterize my invention will be pointed out with particularity in the claims annexed to and forming a part of this specification.

Figure 1:
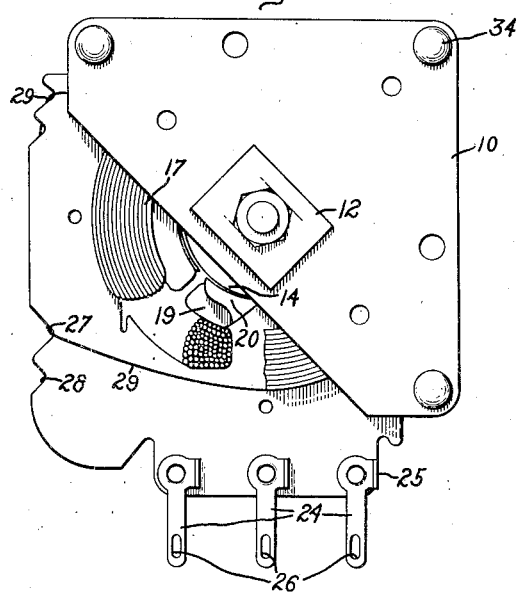
Figure 2:
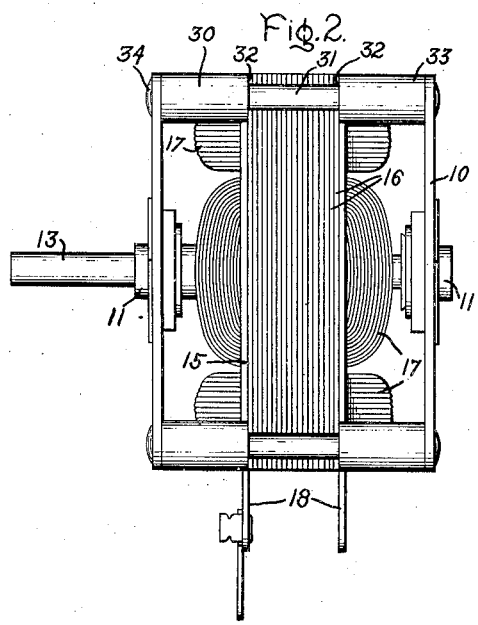
Figure 3:
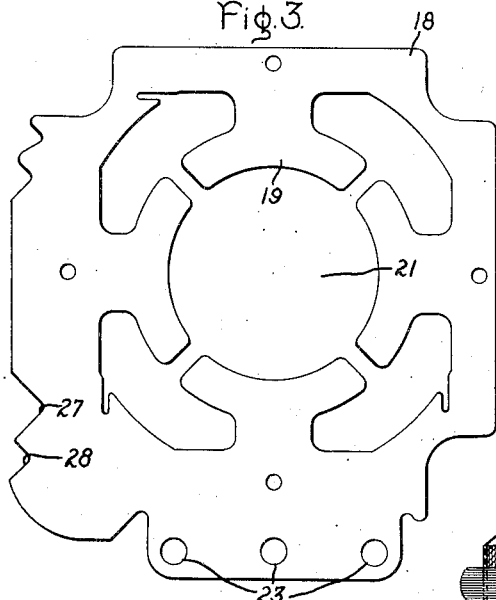
Figure 4:
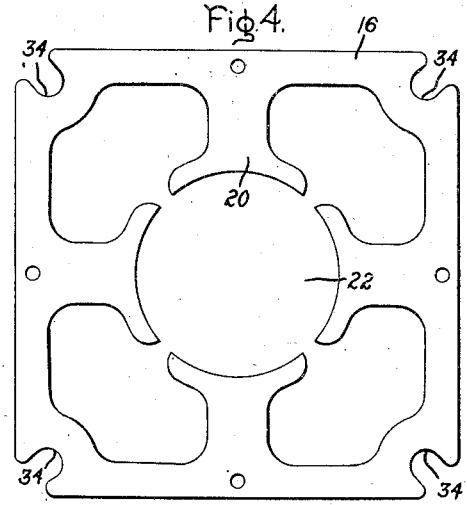
Figure 5:
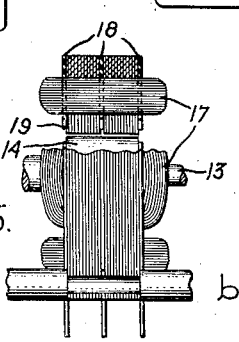

For a better understanding of my invention reference is made to the accompanying drawing, wherein Fig. 1 is an end view in partial section of a dynamo-electric machine provided with an embodiment of my invention; Fig. 2 is a side elevation of the machine illustrated in Fig. 1; Fig. 3 is a plan view of my new and improved insulating material; Fig. 4 is a plan view of a lamination of the core member of the machine shown in Figs. 1 and 2 and Fig. 5 is a side elevation in partial section of a part of the machine illustrated in Fig. 2 provided with a modification of my invention.

Referring to the drawing, in Figs. 1 and 2 I have shown a dynamo-electric machine having a rotatable member and a stationary member provided with end plates 10, which are adapted to support the stationary member. These end plates 10 also support bearing 11, which are secured thereto by any suitable means, such as by nuts 12. These bearings 11 support a shaft 13 upon which is mounted the rotatable member 14, which is adapted to react electro-dynamically with the stationary member of the machine. The rotatable member 14 may be constructed in any suitable manner, and in the illustrated embodiment of my invention, is of the squirrel cage type. The stationary member includes a core member 15 formed of laminations 16 of magnetic material on which are wound coil members or field exciting windings 17. I have shown in the drawing a core member which is composed of a suitable member of laminations 16; however, any other type of core of magnetic material, such as a sintered powdered iron core, may be used. In order to insulate properly the conductors of the field exciting winding 17 from the laminations 16 and to provide a simple support for this winding on the stationary member, I provide a relatively stiff sheet of insulating material 18 longitudinally or radially disposed of the core member, Fig. 2 showing the material arranged on each side of the assembled laminations. As may be seen in Fig. 3, this insulating sheet is made to conform with the same general configuration as that of a lamination 16 shown in Fig. 4. The insulating member 18, however, is made larger than a lamination and is so dimensioned that when it is placed on either side of the stack of laminations it will form an effective arrangement for insulating the coil members or field exciting windings 17 from the core member 15. This is accomplished by making the width of substantially all of the sections of the insulating material 18 slightly greater than the corresponding sections of the laminations 16. For example, the pole portions 19 of the insulating material is slightly wider than the pole portions 20 of the lamination. Thus when the field exciting winding is wound around this insulated core, the conductor which forms the winding will be supported entirely by the insulating member and the winding will conform to the general shape of a four sided figure. Two of the sides will lie on the face of the insulating material 18 and the other two sides will form a span between the edges of the pole portions 19 of the insulating member. Between these spans of the winding and the edge of the laminations there will be a suitably proportioned air space which forms an effective insulating medium on these two sides. The insulating material 18 is also formed with a bore 21 through which the rotor passes, and this bore is of slightly larger diameter than the bore 22 of the lamination 16, as may be seen in Fig. 1. Thus insulating members need be provided on only two sides of the laminated core and the winding may be made of an inexpensive conductor which need have only sufficient insulation thereon to prevent breakdown between contiguous turns thereof.

When the operating characteristics of the dynamo-electric machine require a very long stack of laminations, I have found that it is desirable to provide one or more sheets of my improved insulation within the lamination stack itself in addition to the two sheets placed on the two sides of the core so as to prevent any tendency of the conductors to stray from their normal position and come in contact with the laminations. This modification of my invention is illustrated in Fig. 5 where I have provided a sheet of insulation 18 at the center of the core member in addition to the sheets on the sides. Thus the span of the field exciting winding which is between the edges of the pole portions 19 of the two outside sheets 18 will be prevented from straying by the pole portion 19 of the intermediate sheet 18. It will be seen that any number of these sheets of insulating material may be placed intermediate the ends of the core member, the number necessary being merely dependent on the length of the core member.

My insulating members further provide a supporting means for the terminals and between-pole conductor connections of the coil members with the attending result of a machine which is cheaper and easier to manufacture. Referring to Fig. 3, it will be seen that my improved insulating member 18 is provided on one side with a plurality of holes 23 through which may be attached suitable terminals 24 (Fig. 1). To a portion 25 of the terminals 24 there is attached the ends of the conductors which form the coil members or field exciting windings 17, and to a portion 26 of the terminals 24 there may be attached conductors which are connected to a suitable source of power. My insulating member 18 is further provided with grooves 27 and 28 which provide a simple means for supporting the between-pole conductor connections 29.

In further simplifying my stationary member supporting arrangement I provide improved rivets 30 for securing the stationary member in assembled relation. These rivets are formed with a reduced portion 31 adjacent the center thereof, and shoulders 32 define the ends of the portion of reduced diameter and the portion 33 of larger diameter. In order readily to support the laminations 16 upon the rivets 30, I provide a rounded notch or groove 34 at each of the four outer corners of the laminations, which may readily be formed with the stamping of the lamination 16. These notches 34 form a passage through which the reduced portion 31 of my improved rivet 30 passes and is proportioned so that when the rivets are inserted in the notches 34, the core member 15 will be rigidly held between the shoulders 32 of the rivet 30. I have found that with the use of one rivet at each of three corners of the core member that the core member is securely mounted on the end plate 10. The ends of the rivets 30 secure together the end plates 10 by any suitable means, such as rivet heads 34.

Thus, my improved rivet 30 performs the double function of a spacer element between the end plates and the core member and an attaching member for securely holding the core member to the supporting end plates.

Although I have shown and described particular embodiments of my invention, I do not desire my invention to be limited to the particular constructions disclosed, and I intend in the appended claims to cover all modifications which do not depart from the spirit and scope of my invention.

What I claim as new and desire to secure by Letters Patent of the United States, is:

1. A dynamo-electric machine including a stationary member having a core member and a coil member, a rotatable member adapted to react electrodynamically with said stationary member, and means including insulating members longitudinally disposed of said core member for insulating said coil member from said core member, said insulating members forming a support for two sides of said coil member the other sides thereof forming spans between the edges of said insulating members.

2. A dynamo-electric machine including a stationary member having a core member with a plurality of poles and a coil member for each pole, a rotatable member adapted to react electrodynamically with said stationary member, between-pole conductor connections for said coil members, and means including an insulating member disposed on only two opposite sides of said core member for insulating said coil member from said core member and for forming a support for said between-pole conductor connections.

3. A dynamo-electric machine including a stationary member having a core member and a coil member, a rotatable member adapted to react electrodynamically with said stationary member, and means including insulating members of the same general configuration as said core member disposed on two opposite sides thereof, said insulating members forming a support for two sides of said coil member and being so constructed and arranged as to provide an air gap between the sides of said core member and the portions of the coil adjacent the core and extending between said insulating members.

4. A dynamo-electric machine including a stationary member having a core member and a coil member, a rotatable member adapted to react electro-dynamically with said stationary member, terminals for said coil member, and an insulating member disposed on opposite sides of said core member, said insulating member forming a support for said terminals and providing insulation between said coil and core members.

5. A dynamo-electric machine including a stationary member having a core member of the salient pole type and a coil member associated with each pole, a rotatable member adapted to react electrodynamically with said stationary member, terminals for said coil members, between-pole conductor connections for said coil members, and an insulating member disposed on opposite sides of said core member, said insulating member forming a support for said terminals and said between-pole conductor connections and providing insulation between said coil and core members.

6. A dynamo-electric machine including a stationary member having a core member of the salient pole type and a coil member associated with each pole, a rotatable member adapted to react electrodynamically with said stationary member, between-pole conductor connections for said coil members, and an insulating member of the same general configuration as said core member disposed on opposite sides of said core member, said insulating member being provided with a notch to support said between-pole conductor connections.

7. A dynamo-electric machine including a stationary member having a core member of the salient pole type and a coil member associated with each pole, a rotatable member adapted to react electrodynamically with said stationary member, and insulating means on opposite sides of said core member, said insulating means forming a support for two sides of each of said coil members and being so constructed and arranged as to provide an air gap between the sides of said core member and the portions of the coil adjacent said core and extending between said insulating means.

8. A dynamo-electric machine including a core member and a coil member, and means including insulating members radially disposed of said core member for insulating said coil member from said core member, said insulating members forming a support for two sides of said coil member and having the same general configuration as said core member and having a width greater than that of said core member so as to provide an air gap between the sides of said core member and the portions of the coil adjacent the core member and extending between said insulating members.

9. A dynamo-electric machine including a core member and a coil member, a terminal for said coil member, and means including an insulating member radially disposed of said core member and on opposite sides thereof for insulating said coil member from said core member and for forming a support for said terminal.

10. A dynamo-electric machine including a stationary member having a core member and a coil member, a rotatable member adapted to react electrodynamically with said stationary member, and insulating means radially disposed in said core member and on opposite sides thereof, said insulating means on said opposite sides forming a support for two sides of each of said coil members, said insulating means being so constructed and arranged as to provide an air gap between the sides of said core member and the portions of the coil adjacent said core and extending between the insulating means on said opposite sides.

11. A dynamo-electric machine including a stationary member having a laminated core member and a coil member, a rotatable member adapted to react electrodynamically with said stationary member, end plates disposed on two opposite sides of said core member, rivet members having a portion of reduced diameter and shoulders formed at the ends of the portions of reduced diameter, said shoulders being so spaced that the distance therebetween is substantially equal to the width of the laminations when stacked, said laminations of said core member having a plurality of grooves extending from the outside edges into said laminations and so positioned in each of said laminations as to form a plurality of groups of aligned grooves when said laminations are assembled, said portions of said rivets of reduced diameter fitting into said aligned grooves of said assembled laminations in order that said rivets may rigidly support said core member between said end plates.

WAYNE J. MORRILL.